F. M. SCHULER.
DROP PLACER COMB.
APPLICATION FILED APR. 20, 1921.
1,433,745.  Patented Oct. 31, 1922.
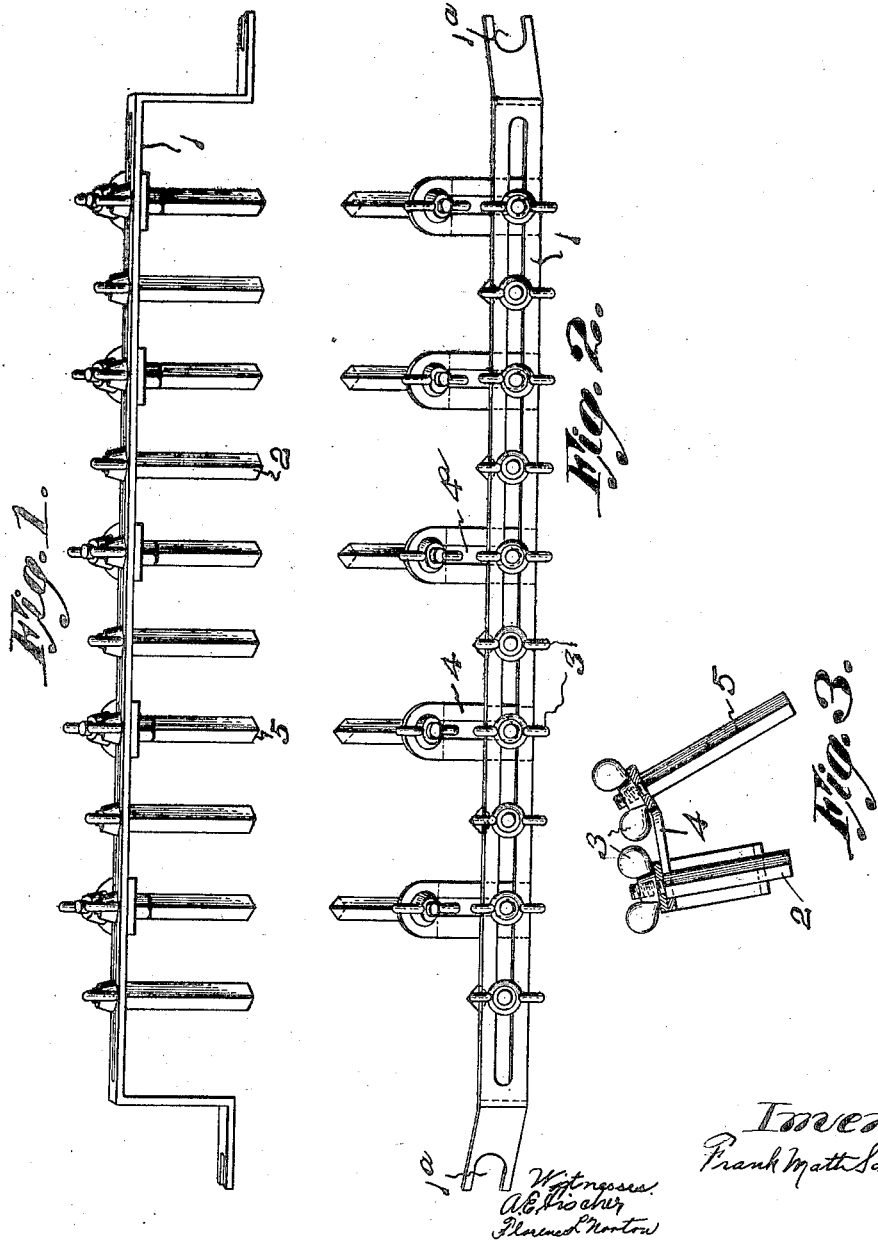

Patented Oct. 31, 1922.

1,433,745

UNITED STATES PATENT OFFICE.

FRANK MATH SCHULER, OF WINONA, MINNESOTA.

DROP-PLACER COMB.

Application filed April 20, 1921. Serial No. 463,367.

*To all whom it may concern:*

Be it known that I, FRANK MATH SCHULER, a citizen of the United States, residing at Winona, in the county of Winona, State of Minnesota, have invented the new and useful Drop-Placer Comb, of which the following is a specification.

This invention relates to an article handling machine, and particularly to a candy making machine in which a group of pieces of candy are fed on a belt or conveyor. The device is particularly adapted to be used with machine of the type well known as the Kihlgren stringer and which are illustrated in Patents Nos. 941,070 and 958,338. In these machines, a large number of candy pieces or drops are fed so that the successive drops which are in a line will come directly under a small stream of chocolate dispensed by the stringer and will thereby get a string of chocolate directly across their centers. It has been quite a problem in this art to effectively feed a large number of these candy drops and to provide mechanism for efficiently arranging them in rows so that they will be properly fed beneath the said streams of chocolate or other substance.

It may be stated that Kihlgren stringers referred to are in connection with the candy coating machines of the type shown in the patents to Carlson No. 790,184, granted May 16, 1905, and 791,243, granted May 30, 1905.

It is an object of this invention to provide a simple and efficient means adapted to be used with the feeding means for the pieces of candy or candy drops adapted to arrange said pieces or drops in rows as they are fed to the stringer.

It is a further object of the invention to provide a device for this purpose comprising a comb having teeth depending adjacent the feeding surface, which teeth are adapted to contact the drops as the latter pass the same.

It is still another object of the invention to provide such a comb having a plurality of rows of teeth, the teeth in the respective rows being alternated in position and lying in planes extending at an angle to each other.

These and other objects of the invention will be fully set forth in the following description made in connection with the accompanying drawings in which like reference characters refer to the same parts throughout the different views, and in which, Fig. 1 is a view in front elevation of the comb, Fig. 2 is a plan view thereof; and Fig. 3 is a view in side elevation thereof, as seen from the right of Fig. 2.

Referring to the drawings, the device is illustrated as comprising a bar 1 having a main central portion with a longitudinal slot extending through substantially its entire length. The bar is bent at right angles at its end portion and its ends are again bent outwardly for a short distance and provided with slots 1ª. These out-turned end portions form means by which the bar can be conveniently bolted or otherwise attached at each side of the feeding means of the candy machine, the main portion 1 of the bar thus being arranged to extend above and across the feeding means. A plurality of teeth 2 are provided having threaded shanks at their upper ends which extend through the slot in bar 1 and have screwed thereon wedge clamping nuts 3 by which they may be clamped in any desired position along said bar. A plurality of flat bars 4 are provided having central slots 4ª extending longitudinally thereof. One end of each of these bars is disposed under the end of the bar 1 and connected thereto by a headed bolt passing through the slot 4ª and projecting upwardly through the slot and the bar 1, said bolts being provided with clamping nuts 3 adapted to clamp the bars 4 in any desired adjusted position along the bar 1. The bars 4 have an upturned portion at their outer ends making a slight angle with the main portion thereof, which ends are apertured to receive the threaded shanks formed on the ends of teeth 5, these teeth being clamped in the ends of the bar 4 by wedge nuts 3 applied to said shanks. It will be noted that the teeth 2 and 5 are of angular or quadrilateral shape and have an angle thereof directed forwardly.

The bar 1 is adapted to be attached to the machine so that the teeth 2 and 5 have the position illustrated in Fig. 3, being inclined rearwardly in the direction of travel of the conveyor with which they co-operate. It will also be noted that the teeth 5 are arranged alternately or in staggered relation to the teeth 2. As the feeding means having a large number of tablets or pieces of candy thereon travel past the teeth 2 and 5, the teeth will contact with the said tablets or pieces which will be moved to one side or the other by the teeth 2. This movement will be assisted and made gradual by the inclined sides of the teeth. As the pieces pass on further, they will also be contacted by the teeth 5 and, if too far to one side, will again be moved laterally. The articles or pieces of candy will thus be arranged in straight rows and will be moved under the chocolate dispensing means in accurate position. It is necessary in handling the coated candy drops to have the spaced rows of teeth, for if it is attempted to have but one row and have the teeth closer together, the teeth soon become clogged with the coating of chocolate, or other substance, which greatly interferes with the operation. The rearward inclination of the teeth also results in a more gradual movement of the drops or a more gradual starting of the movement.

The present device has been amply demonstrated in practice and is found to work much better with round drops or those that are in prisms or semi-circular shape than does the vibrating grooved feeder belt which has previously been used.

The device is extremely simple, easily attached to the machine and can be provided at small expense.

It will, of course, be understood that various changes may be made in the form, details and arrangement of the parts without departing from the scope of applicant's invention, which, generally stated, consists in the matter shown and described and set forth in the appended claims.

What is claimed is:

1. A device adapted to be applied to an article feeding machine comprising a comb having a plurality of spaced rows of teeth, the teeth of one row alternating with the teeth in the other and the teeth of the respective rows extending in diverging planes.

2. An alining device adapted to be disposed over a traveling feeding means comprising, a plurality of spaced rows of teeth, the adjacent sides of all said teeth being parallel and the teeth of respective rows lying in planes extending at an angle to each other.

3. A placing comb for a moving article feeding member comprising, a plurality of rows of depending teeth spaced in the direction of movement of said member, the teeth of one row alternating with those of another.

4. A placing comb adapted to be disposed over a traveling feeding means, comprising a plurality of spaced rows of depending teeth, said teeth being inclined to the vertical in the direction of travel of said feeding means.

5. A placing comb for a moving feeding means comprising, a row of teeth inclined in the direction of movement of said means, the front of said teeth being formed by laterally diverging planes.

6. A placing comb for a feeding means comprising a bar adapted to extend across and above said feeding means, a plurality of teeth longitudinally adjustable on said bar, a plurality of bars disposed between said teeth extending transversely of and longitudinally adjustable on said bar, each of said bars having a tooth depending therefrom.

7. A placing comb adapted to extend transversely over a moving feeding means comprising a plurality of rows of spaced depending teeth, the teeth of the respective rows being inclined in the direction of movement of said feeding means and all of said teeth terminating in a common plane.

In testimony whereof I affix my signature in the presence of two witnesses.

FRANK MATH SCHULER.

Witnesses:
A. E. FISCHER,
FLORENCE L. NORTON.